United States Patent [19]
Skudlarek

[11] Patent Number: 5,472,108
[45] Date of Patent: Dec. 5, 1995

[54] BODY CONFORMING FUEL TANK CAP

[75] Inventor: Donald A. Skudlarek, Troy, Mich.

[73] Assignee: Ford Motor Company, Dearborn, Mich.

[21] Appl. No.: 168,339

[22] Filed: Dec. 17, 1993

[51] Int. Cl.[6] .............................. B65D 47/02; B65B 3/00
[52] U.S. Cl. ..................... 220/86.2; 220/281; 220/326; 220/DIG. 33
[58] Field of Search ................................. 220/210, 260, 220/281, 326, 324, 348, 345, 304, 378, 86.2, DIG. 33, DIG. 32

[56] References Cited

U.S. PATENT DOCUMENTS

| | | | |
|---|---|---|---|
| 1,774,091 | 8/1930 | Glawe et al. . | |
| 1,847,117 | 3/1932 | Lantero . | |
| 1,958,019 | 5/1934 | Reasoner . | |
| 2,033,432 | 3/1936 | Leach | 220/86.2 |
| 2,083,668 | 6/1937 | Boesch | 220/86.2 X |
| 2,466,075 | 4/1949 | Bentley et al. | 220/86.2 |
| 2,466,076 | 4/1949 | Bentley et al. | 220/86.2 |
| 2,598,670 | 6/1952 | Bentley et al. | 220/86.2 |
| 2,816,433 | 12/1957 | Friend . | |
| 2,946,215 | 7/1960 | Eshbaugh et al. . | |
| 3,915,335 | 10/1975 | Shanklin et al. . | |
| 4,027,910 | 6/1977 | Farelli | 220/86.2 X |
| 4,160,511 | 7/1979 | Hukuta et al. . | |
| 4,294,376 | 10/1981 | Keller . | |
| 4,377,243 | 3/1983 | Shaw et al. . | |
| 4,498,600 | 2/1985 | Blion | 220/DIG. 33 X |
| 4,579,244 | 4/1986 | Fukuta . | |
| 4,676,393 | 6/1987 | Daniel . | |
| 4,738,376 | 4/1988 | Markus . | |
| 5,000,339 | 3/1991 | Wheat et al. . | |
| 5,381,919 | 1/1995 | Griffin et al. | 220/DIG. 33 X |
| 5,385,256 | 1/1995 | Brown | 220/DIG. 33 X |

*Primary Examiner*—Jes F. Pascua
*Attorney, Agent, or Firm*—Daniel M. Stock; Roger L. May

[57] ABSTRACT

A fuel tank cap assembly is provided which includes a plug portion sealingly engageable with a fuel tank filler pipe and a cover portion that is positionable in blending contiguous relationship with adjacent portions of the automotive vehicle body when the plug portion is positioned in a sealing position with respect to the fuel tank filler pipe.

17 Claims; 3 Drawing Sheets

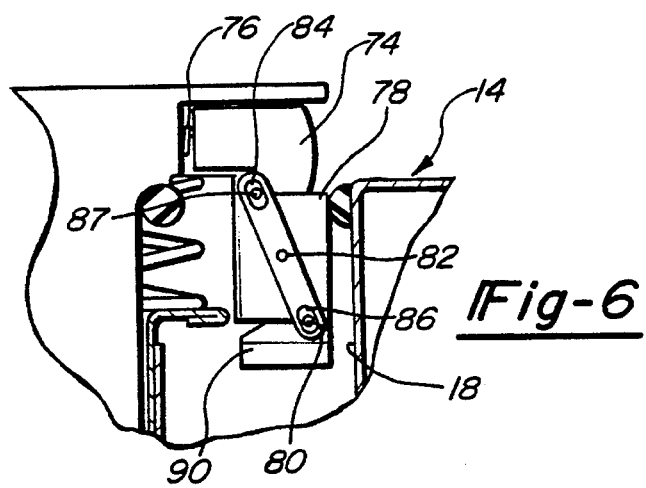
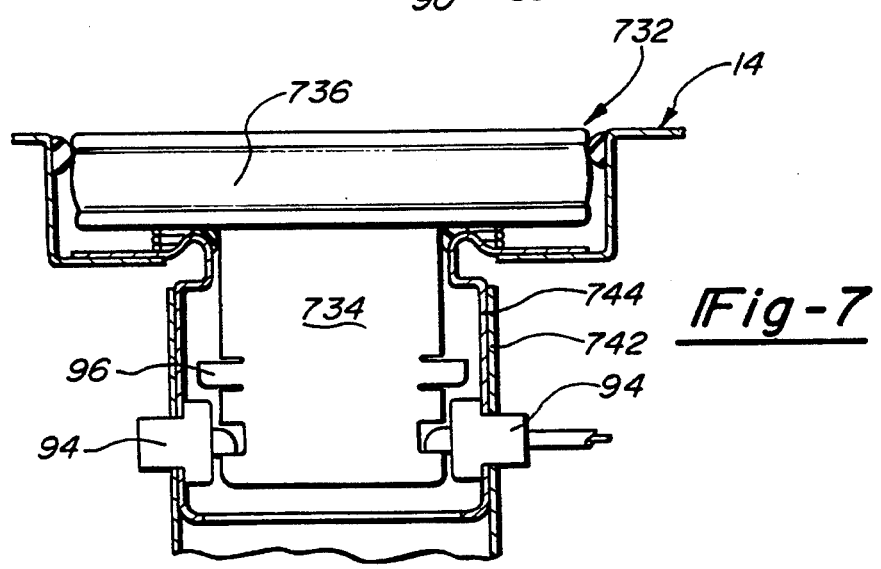
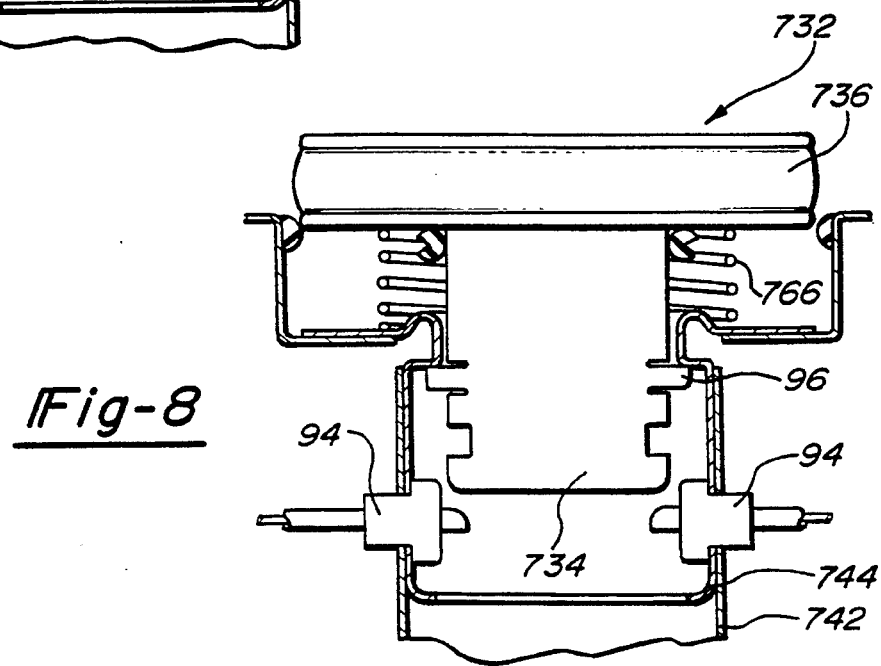

BODY CONFORMING FUEL TANK CAP

BACKGROUND OF THE INVENTION

1. Technical Field

The invention relates to automotive fuel tank closures in general, and more specifically to nonrotationally actuated automotive fuel tank closures.

2. Description of the Prior Art

In modern automotive vehicle design, it is desirable to provide access to the automobile's fuel tank for a gas station filler hose nozzle in a manner that complements the aerodynamic and aesthetic approach to the design of the vehicle body. Currently, the most commonly used approach is to provide a threaded gas cap at the end of a fuel filler pipe connected to the fuel tank with the gas cap being fully contained within a small compartment closed by a fuel filler door. Fuel filler doors are frequently hingedly connected to a portion of the automotive body and generally present an exterior surface which blends with the outer surface of the automotive body. The multiplicity of components required to achieve the design goals results in an outlay of cost and weight that is not desirable in all circumstances.

One approach to reducing the cost for accomplishing the desired functions has been to construct the gas cap so that it presents an outer surface that need not be enclosed by a body conforming fuel filler door. In certain designs, such an approach is aesthetically unacceptable. In others, it is an extremely limited design approach because the threaded gas cap must present a round surface to be outside of the vehicle body in order to conform with any aperture through which it will be inserted. That is to say, a variety of shapes in the outer surface of the gas cap is not possible.

SUMMARY OF THE INVENTION

Responsive to deficiencies in the related art, the present invention provides a fuel filler cap assembly which includes a plug portion sealingly engageable with the fuel tank filler pipe through nonrotational insertion to a sealing position with respect to the filler pipe, and a covered portion fixedly carried with the plug portion which has an outer surface substantially contiguous or blending with the automotive vehicle body when the plug portion is inserted to its sealing position.

It is an object of the present invention to provide a fuel tank cap assembly which embodies an outer surface complementary to the adjacent portions of the vehicle body and which effects sealing engagement with respect to the fuel filler pipe in an efficient and economical manner.

According to one feature of the present invention, latch means are provided for releasably securing the fuel tank cap assembly in the sealing position.

According to another feature of the present invention, a spring is operatively disposed between the fuel tank filler pipe and the fuel tank cap plug portion to urge the fuel tank cap assembly away from the sealing position toward a free position.

According to yet another feature of the present invention, secondary latch means are provided for selectively limiting movement of the fuel tank cap assembly toward the free position.

BRIEF DESCRIPTION OF THE DRAWINGS

These and other objects and features of the present invention will be apparent to those skilled in the automotive body arts upon reading the following description with reference to the accompanying drawing, in which:

FIG. 6 is an enlarged cross sectional view of a latch portion of the embodiment of FIGS. 4 and 5;

FIG. 7 is a cross sectional view of the fuel tank cap assembly of another embodiment of the fuel tank cap assembly of the present invention; and FIG. 8 is a cross sectional view similar to FIG. 7, showing the fuel tank cap assembly of FIG. 7 in a released position.

DESCRIPTION OF THE PREFERRED EMBODIMENTS

Figure 1:
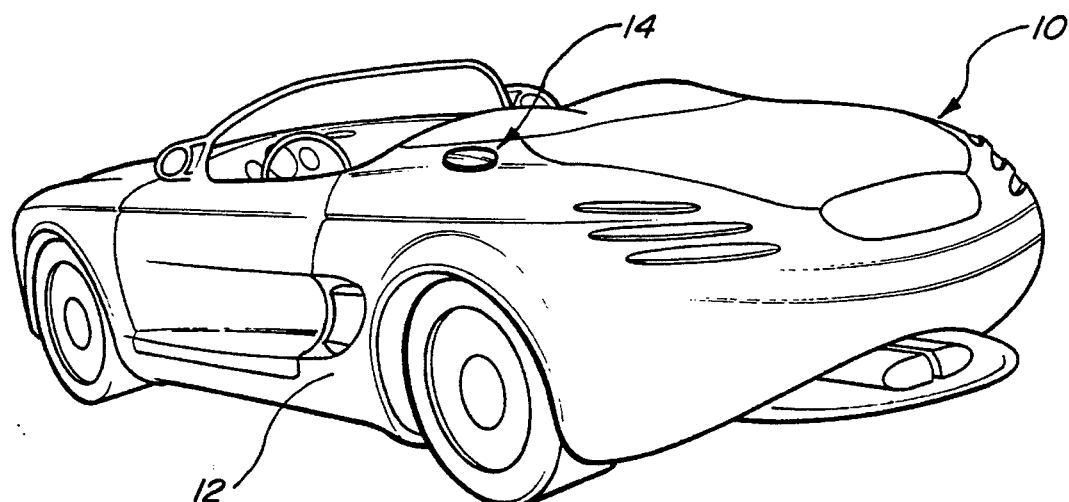
FIG. 1 is a rear perspective view of an automotive vehicle including the fuel tank cap assembly of the present invention.

Turning now to drawings, and in particular to FIG. 1 thereof, an automotive vehicle 10 is illustrated as having a body indicated generally at 12 which includes an outer surface 14. The outer surface 14 is appropriately configured to achieve the aesthetic and aerodynamic design goals for the vehicle 10. As may best be seen in FIG. 3, a recess 16 is formed in the external surface 14. The recess 16 is illustrated as presenting a cylindrical inner surface 18. It is to be understood, however, that the recess 16 may readily be formed to a noncircular cross section so that another annular surface would replace the cylindrical configuration of the surface 18.

Figure 2:
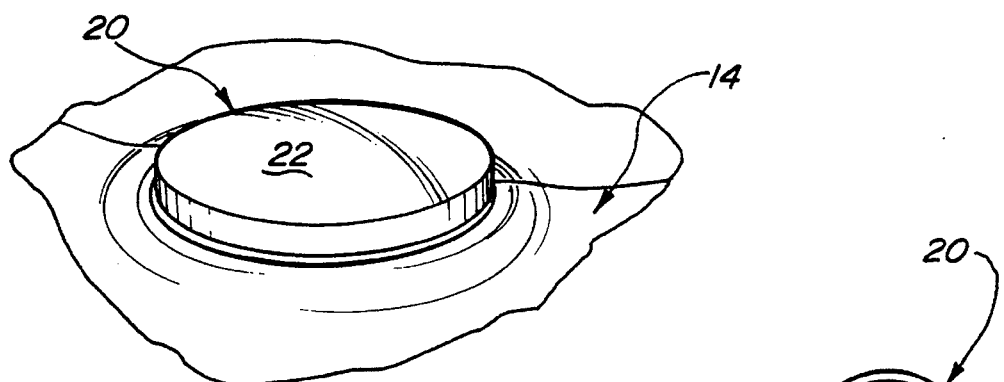
FIG. 2 is a perspective view of the fuel tank cap assembly of the present invention in a position spaced from its primary latch position.
Figure 3:
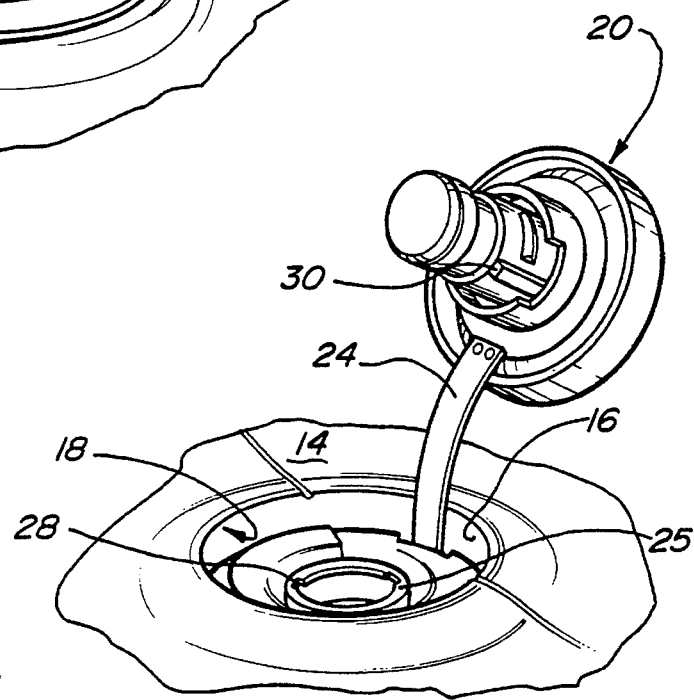
FIG. 3 is a view of the fuel tank cap assembly of the present invention in the free position.

According to the present invention, a fuel tank cap assembly 20 is provided which is movable with respect to the vehicle body 12 between a sealing position, as shown in FIG. 1, in which fuel tank cap assembly 20 is in a position in which its outer surface is generally contiguous and blending with the external surface 14 of the vehicle body 12 and release and free positions as shown in FIGS. 2 and 3, respectively. In the release position of FIG. 2, it is illustrated that an external surface 22 of the fuel tank cap assembly 20 is displaced from the external surface 14 of the vehicle body 12.

In the free position of FIG. 3, the fuel tank cap assembly 20 is separated entirely from the vehicle, except by the connection through a flexible tether 24 to a portion of the vehicle body 12 within the recess 16.

According to the present invention, the fuel tank cap assembly 20 moves between the positions of FIGS. 1–3 without rotation. This permits the control of rotative orientation of the fuel tank cap assembly 20 with respect to the vehicle body 12 without dependence upon tolerance between mating threaded parts as has been the case in the prior art. A portion of the fuel tank cap assembly 20, as may best be seen in FIG. 3, is engageable within an end 25 of fuel tank filler pipe 26. Notches 28 may be formed in the filler pipe 26 to receive ribs 30 carried on the fuel tank cap assembly 20 to fix the fuel tank cap assembly 20 against rotation when in the sealing position of FIG. 1. Hence, the sealing position of FIG. 1 is a rotatively fast position of the fuel tank cap assembly 20 with respect to vehicle body 12.

Figure 4:
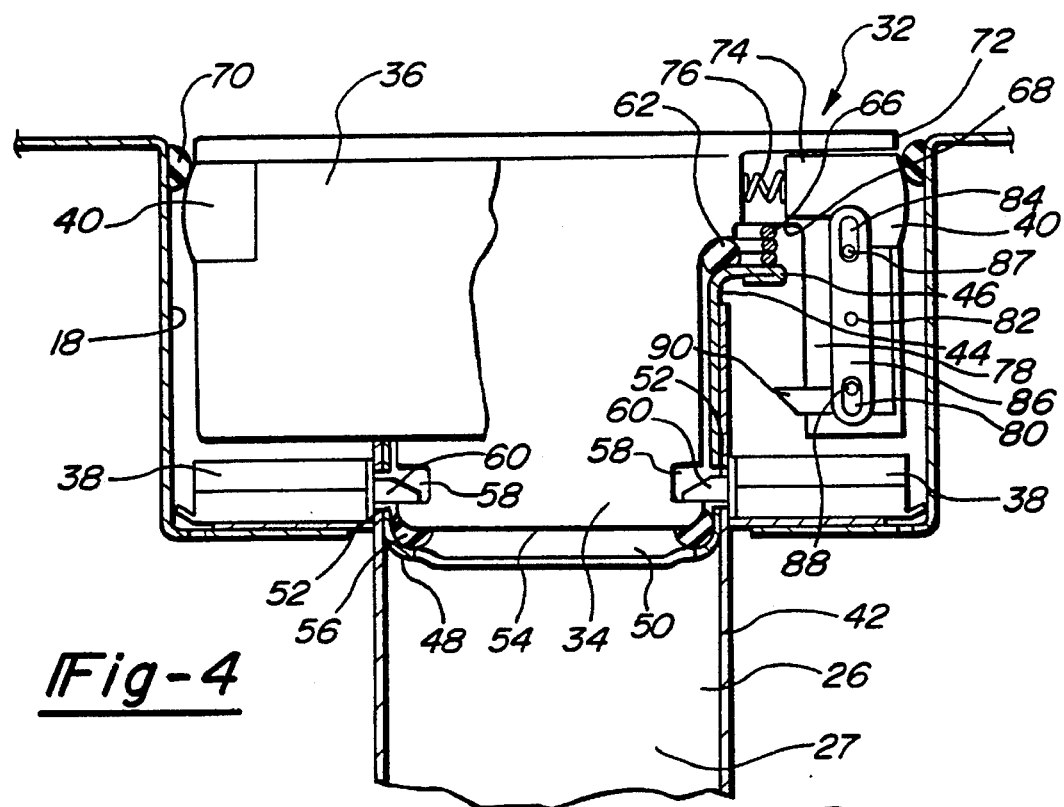
FIG. 4 is a cross sectional view of one embodiment of the fuel tank cap assembly of the present invention in the sealing position.
Figure 5:
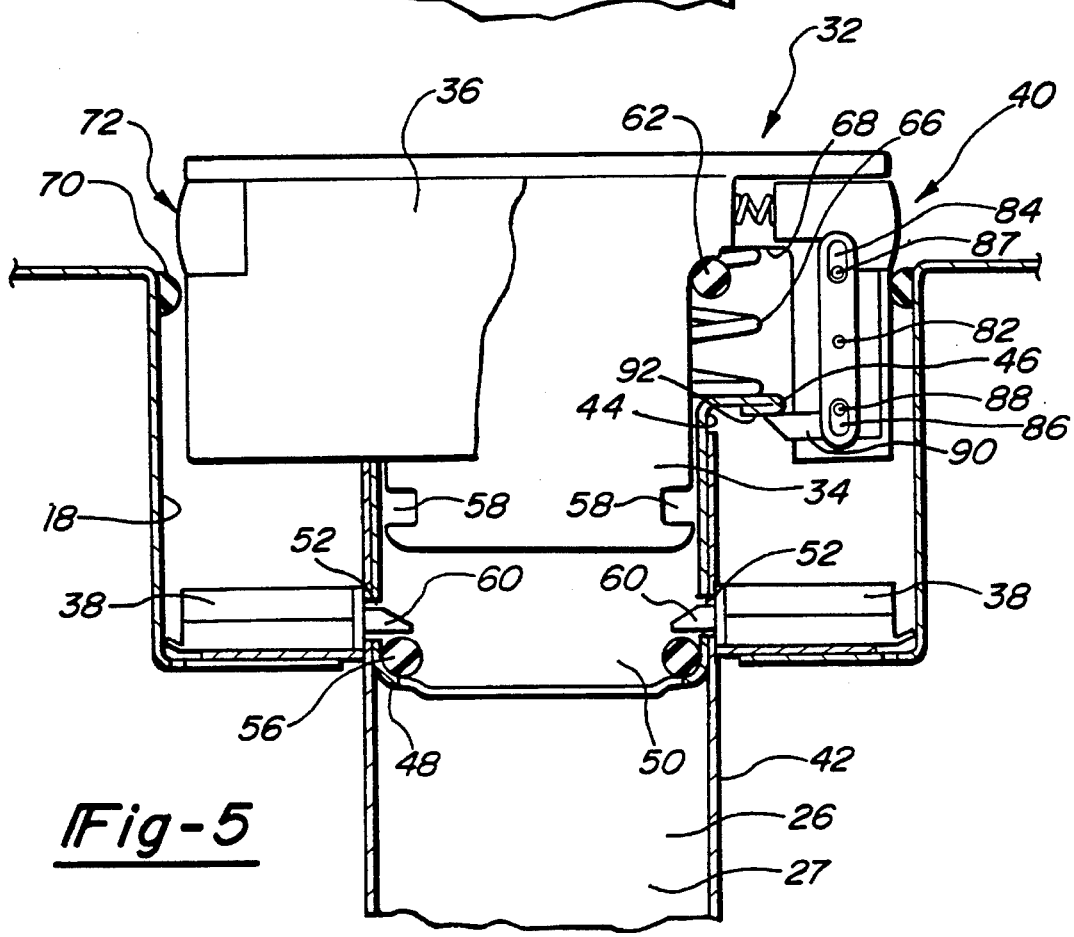
FIG. 5 is a cross sectional view similar to FIG. 6, showing the fuel tank cap assembly in a released position.

Turning next to FIGS. 4 and 5, one embodiment of the fuel tank cap assembly 20, indicated at 32, is illustrated as having an inner plug portion 34 and an otter cover portion 36, a primary latch assembly 38 and a secondary latch assembly 40. The plug portion 34 is illustrated as a cylindrical member having the fuel tank cap assembly 32 operatively engageable with the fuel filler pipe 26 which is illustrated as including an outer pipe 42 and an inner cup member 44 fixedly secured within the pipe 42 and including an annular out-turned flange portion 46. The cup portion 44 terminates at its inner end with a generally disc-like base 48 pierced by a filling aperture 50. Access apertures 52 pierce both the pipe 42 and the cup 44 to receive a portion of the primary latch members 38. The plug portion 34 is preferably cylindrical and is received within the preferably cylindrical cup 44 and includes a suitable surface 54 for engaging an inner seal member such as O-ring seal 56 compressively against the base 50 of the cup 44 when the fuel tank cap assembly 32 is in the sealed position of FIG. 4. Recesses 58 are formed in the plug portion 34 for receiving latch portions 60 of the primary latch members 38 to maintain the fuel tank cap assembly 32 in the sealed position shown in FIG. 4.

The plug portion 34 extends generally perpendicularly from the cover portion 36 which may be of any convenient or desirable cross section. At the interface between the cover portion 36 and the plug portion 34, another O-ring seal member 62 or outer seal member is carried for sealing engagement with the out-turned flange portion 46 of the cup member 44 in the sealed position shown in FIG. 4.

Also engaging the out-turned flange portion 46 at an upper annular surface 64 thereof is preferably situated a coiled spring 66 which engages an inner surface 68 of the cover portion 36 urging the fuel tank cap assembly 32 generally upwardly, as viewed in FIG. 4, away from the sealing position toward a separated or free position like that shown in FIG. 3. Movement from the position of FIG. 4 is resisted by operation of a latch member 60 of the primarily latches 38, which are illustrated in FIGS. 4 and 5 only diagrammatically, but which may be well-known electrically operated solenoid latches or cable actuated latches.

The primary latch members 38 are preferably carried within the recess 16 and the sealing arrangement shown is effective to isolate the interior 27 of the fuel tank filler pipe 26 from the atmosphere. In addition to the seals 56, 62 along the path of the filler pipe 26, an additional cover seal 70 is preferably provided between the outer surface 72 of the cover portion 36 and the inner surface 18 of the recess 16. After release of the primary latch members 38, the fuel tank cap assembly 32 moves upward under the influence of the spring 66 to the released position shown in FIG. 5, where further upward movement is resisted by the secondary latch assemblies 40. The latch assemblies 40 (two shown) preferably include an actuator member 74 urged laterally outwardly by coiled spring 76 and laterally slidably movable with respect to the remainder of the cover portion 36 against the spring 76. A fixed body portion 78 depends from the cover portion 36 and a link 80 is mounted for pivotal movement about a pin 82 carried with the body portion 78. The link 80 includes slots 84, 86 at opposed ends which receive pins 86, 88. The pin 86 is secured to the actuator member 74 and the pin 88 is secured to a catch 90 which engages a lower surface 92 of the out-turned flange portion 46 of the filler pipe assembly 26.

As may best be seen in FIG. 6, depressing the actuator member 74 against the spring 76 effects movement of the catch 90 out of engagement with the flange 46 permitting upward movement past the position of FIG. 5 to remove the fuel tank cap assembly 32 from engagement with the fuel filler pipe 26 to permit fueling of the vehicle 10. It will be noted that it contributes to the compact design of the fuel tank cap assembly of the present invention that both the primary latch assembly 38 and the secondary latch assembly 40 are fully contained within the recess 16.

Turning now to FIGS. 7 and 8, an alternative embodiment of the fuel tank cap assembly of the present invention is illustrated in a form in which like numbers preceded by the numeral 7 refer to like parts of the preceding drawing figures. This embodiment differs from that previously described primarily in the indication of the provision of a solenoid operated primary latch assembly 94 which may be operated from the vehicle passenger compartment. A secondary pawl 96 is also indicated, but those skilled in the art will appreciate that actuation of the secondary pawl 96 could be effected by known spring loading devices without use of the preferred laterally slidable latch mechanism shown as secondary latch assembly 40 in the FIGS. 4 and 5 embodiment.

While only two embodiments of the fuel tank cap assembly of the present invention have been described, others may occur to those skilled in the automotive body arts which will not depart from the scope of the following claims.

What is claimed is:

1. In an automotive vehicle having a body with an external surface, a fuel tank filler pipe having an open end adjacent the body external surface and a depression formed in the body external surface and defining a generally continuous annular surface around the fuel tank filler pipe, a fuel tank cap assembly comprising:

a plug portion sealingly engageable with the fuel tank filler pipe solely by nonrotational insertion into the filler pipe to a rotatively fast sealing position;

a cover portion fixedly carried with said plug portion at one end of said plug portion and having an outer surface distal said plug portion positionable in substantially blending planar relationship with the body external surface within said depression when said plug portion is in said sealing position;

a primary latch means engageable with said plug portion for releasably securing said fuel tank cap assembly in said sealing position; and secondary latch means carried between said cover portion and said fuel tank filler pipe separate from said primary latch means for selectively limiting movement toward said free position.

2. A fuel tank cap assembly as defined in claim 1, and further comprising a spring operatively disposed between the fuel tank filler pipe and said plug portion to urge said plug portion away from said sealing position toward a free position separate from said filler pipe.

3. A fuel tank cap assembly as defined in claim 1 and further comprising secondary latch means carried between said cover portion and said fuel tank filler pipe for selectively limiting movement toward said free position.

4. A fuel tank cap assembly as defined in claim 3 wherein at least one of said primary latch means and said secondary latch means is remotely actuated.

5. A fuel tank cap assembly as defined in claim 3 wherein both of said latch means are positioned within said depression.

6. A fuel tank cap assembly as defined in claim 1 and further comprising an outer seal member sealingly engaged between said cover portion and the fuel tank filler pipe, and an inner seal member sealingly engaged between the end of said plug portion distal the cover portion and the fuel tank filler pipe.

7. A fuel tank cap assembly as defined in claim 1, and further comprising a cover seal member sealingly engaged between said cover portion and said depression annular surface.

8. A fuel tank cap assembly as defined in claim 1 wherein said primary latch means is positioned within said depression.

9. A fuel tank cap assembly as defined in claim 1 wherein said secondary latch means is positioned within said depression.

10. In an automotive vehicle having a body with an external surface, a fuel tank filler pipe having an open end adjacent the body external surface and a depression formed in the body external surface and defining a generally continuous annular surface around the fuel tank filler pipe, a fuel tank cap assembly comprising:

a plug portion sealingly engageable with the fuel tank filler pipe solely by nonrotational insertion into the filler pipe to a rotatively fast sealing position;

a cover portion fixedly carried with said plug portion at one end of said plug portion and having an outer surface distal said plug portion that substantially blends with the body external surface within said depression when said plug portion is in said sealing position;

a latch assembly carried with said cover portion and having an actuator member laterally movable with respect to the cover portion;

a catch engageable with said fuel tank filler pipe and linkage means interconnecting said actuator member and said catch to move said catch between a position preventing nonrotatable movement of said fuel tank cap assembly with respect to the fuel tank filler pipe and a position permitting such movement;

primary latch means engageable with said plug portion for releasably securing said fuel tank cap assembly in said sealing position; and secondary latch means operatively disposed between said cover portion and said fuel tank filler pipe to selectively limit movement toward said free position.

11. A fuel tank cap assembly as defined in claim 10, and further comprising a spring means operatively engaged between the fuel tank filler pipe and said plug portion for urging said plug portion away from said sealing position toward a free position separate from said filler pipe.

12. A fuel tank cap assembly as defined in claim 11 wherein said primary latch means is positioned within said depression.

13. A fuel tank cap assembly as defined in claim 11, and further comprising an outer seal member sealingly engaged between said cover portion and the fuel tank filler pipe, and an inner seal member sealingly engaged between the end of said plug portion distal the cover portion and the fuel tank filler pipe.

14. A fuel tank cap assembly as defined in claim 11, and further comprising a cover seal member sealingly engaged between said cover portion and said depression annular surface.

15. A fuel tank cap assembly as defined in claim 11, and further comprising a cover seal member sealingly engaged between said cover portion and said depression annular surface, and wherein said cover member seal member is sealingly engaged between said actuator member and said fuel tank filler pipe.

16. A fuel tank cap assembly as defined in claim 10 wherein said primary latch means is positioned within said depression.

17. A fuel tank cap assembly as defined in claim 10 and further comprising a flexible tether connected between said fuel tank cap assembly and said vehicle body.

* * * * *